United States Patent [19]
Ikrath et al.

[11] 3,733,038
[45] May 15, 1973

[54] DISCHARGE DEVICE FOR ELECTROSTATIC CHARGES

[75] Inventors: Kurt Ikrath, Elberon; Kenneth J. Murphy, Red Bank, both of N.J.

[73] Assignee: The United States of America as represented by the Secretary of the Army, Washington, D.C.

[22] Filed: May 4, 1971

[21] Appl. No.: 140,171

[52] U.S. Cl. ................................244/1 A, 317/2 E
[51] Int. Cl. ...................................................H05f 3/06
[58] Field of Search ..................60/23, 26.1; 102/39, 102/46; 149/37; 244/1 A, 17.19, 56, 58, 74; 317/2 R, 2 E, 80

[56] References Cited

UNITED STATES PATENTS

| | | | |
|---|---|---|---|
| 2,665,860 | 1/1954 | Bancroft, Jr. | 244/58 |
| 2,921,521 | 1/1960 | Haye et al. | 102/39 |
| 2,985,104 | 5/1961 | Fox | 102/39 |
| 3,249,049 | 5/1966 | Zimmerman | 102/46 |
| 3,278,138 | 10/1966 | Haberkorn | 244/74 X |
| 3,600,632 | 8/1971 | Bright et al. | 317/2 E |

*Primary Examiner*—Milton Buchler
*Assistant Examiner*—Stephen G. Kunin
*Attorney*—Harry M. Saragovitz, Edward J. Kelly, Herbert Beil & Charles F. Gunderson

[57] ABSTRACT

This disclosure relates to aircraft and particularly to devices for reducing the triboelectric or electrostatic charge on an aircraft. More particularly, this disclosure relates to a device for penetrating the gaseous dielectric insulation around an aircraft to discharge the accumulated charge on said aircraft. More particularly, this disclosure relates to the projection of a stream of conductive gases, at high velocity, through the air surrounding an aircraft, towards ground or any point of high potential gradient with respect to the aircraft, to provide a conductive discharge path through the air to neutralize any electrostatic charge on the aircraft.

4 Claims, 2 Drawing Figures

PATENTED MAY 15 1973 3,733,038

INVENTORS,
KURT IKRATH &
KENNETH J. MURPHY

BY Charles F. Gunderson AGENT
Harry M. Saragovitz, Edward J. Kelly &
Herbert Berl
ATTORNEYS

DISCHARGE DEVICE FOR ELECTROSTATIC CHARGES

BACKGROUND OF THE INVENTION

The problems of electrostatic, or triboelectric and atmospheric, charging of an aircraft during flight is well known. The charge is built up by the friction of the air along the body of the aircraft, or the blades of a propellor-driven aircraft, or the rotors of a helicopter during flight. As in the case of electrostatic charges, the low capacitance of the aircraft with respect to ground and the very effective insulation of the air between the aircraft and ground make extremely high potential gradients possible and result in electrostatic charges of extremely high voltage.

These electrostatic charges are discharged as the wheels of a descending aircraft touch the ground and, in the case of an aircraft coming into an open runway, present no serious hazard. However, in the case of helicopters, hovering very close to ground, and dropping down cables, during sling loading operation, to pick up cargos — which may include gasoline or other explosives — there is a very real danger of fire or explosion as well as bodily injury when the cable drops close enough to arc-over.

One of the standard methods for reducing an electrostatic charge is to use the long, sharp, pointed, corona discharge device, that is seen on many aircraft. However, this functions only when the charge is high enough to build up the necessary field strength around the sharp point for the corona discharge phenomenon. This cannot completely discharge the aircraft, and may not reduce the electrostatic charge enough for safety.

The corona discharge device can be made active by applying high voltage RF energy to the sharp-pointed conductor. This more effectively reduces the charge on the aircraft but, it also produces excessive radio frequency noise and may completely interrupt radio communication.

The corona discharge device can also be made active by coating the sharp-pointed conductor with a nuclear radiating compound that ionizes the air around the point. However, this introduces radiation problems and requires strict control of time and radiation.

Obviously, a weighted wire could be lowered from the hovering aircraft to ground the aircraft before any other contact is made with grounded personnel or equipment. However, such a system would have mechanical problems such as the control of the unwinding or winding of the wire; the breakage or failure of the wire; and the potential arcing or physical damage from the weight hanging from the conductor.

It is therefore an object of this invention to provide an improved system for discharging the electrostatic charge on an aircraft. It is a further object of this invention to provide an improved system for discharging the electrostatic charge of an aircraft without introducing excessive radio noise. It is a further object of this invention to provide an improved system for discharging the electrostatic charge on an aircraft without using complicated mechanical structures on moving parts.

SUMMARY OF THE INVENTION

These and other objects are accomplished by attaching a device such as a gas generator or gas producing cartridge in the form of a small jet engine or rocket motor to the external surface of an aircraft. The jet engine has a fuel that includes an oxidizing agent such as potassium dichromate that can be ignited to produce a stream of high-velocity, electrically-conductive gasses from a nozzle that is directed away from the aircraft.

The stream of conductive gases lowers the work function of the insulation of the air surrounding the aircraft. This lowers the effective resistance in the path of the high velocity stream through the air surrounding the aircraft, to permit the discharge of any substantial electrostatic charge between the aircraft and the ground.

DESCRIPTION OF THE PREFERRED EMBODIMENT

Figure 1:
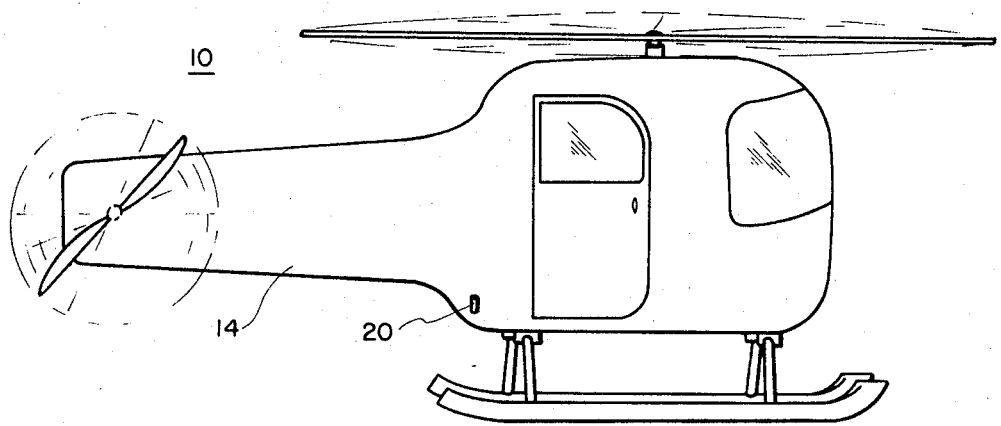
FIG. 1 illustrates a typical aircraft hovering above ground.
Figure 1:
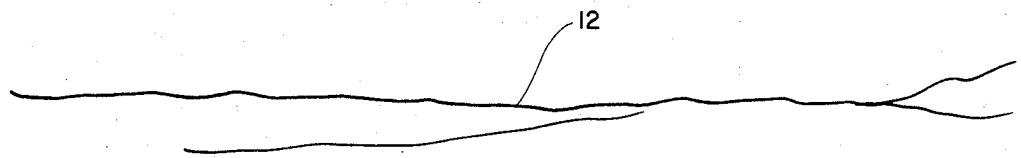

Referring now more particularly to FIG. 1, an aircraft 10 is shown in relative proximity to the ground 12. A small gas generating jet rocket engine 20 is attached to the hull 14 of the aircraft, which is presumably of a conductive material.

Figure 2:
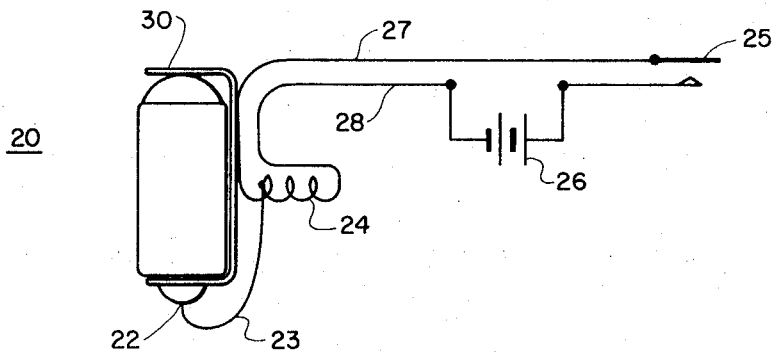
FIG. 2 illustrates the mounting and control connections of a typical jet engine.

FIG. 2 shows a gas generating jet rocket engine 20 of approximately full size and shape. The jet engine contains a solid-fuel-pellet that has a controlled rate of burning to generate a gas that exhausts, at high velocity, through a metered hole, or nozzle 22, at one end of the engine.

The pellet is ignited by a jet wick 23 which extends from the pellet, inside the jet engine, through the nozzle, to a heating coil 24. The jet wick is lit by the heating coil which is energized by a switch 25 that connects a battery 26 to the heating coil through conductors 27 and 28.

In practice the movement of the aircraft through the air, or the high speed of the rotary blades through the air, builds up a triboelectric, electrostatic charge on the surface of the aircraft in a well known manner. This change may be in the order of hundreds of thousands of volts with respect to the ground potential at 12, and since the aircraft may have a capacity in the order of several hundreds of picrofarads with respect to ground, a spark produced by the sudden discharge of this electrostatic charge could be of considerable strength and could easily ignite gasoline fumes, or other explosive material, or endanger personnel.

In operation when it is necessary or desirable to discharge the aircraft 10, the switch 25 is depressed to carry a current from the battery 26 through the conductors 27 and 28 to the heating coil 24. When this becomes hot enough, it ignites the potassium-dichromate-coated jet wick 23 which burns into the jet engine fuel, in the form of a pellet or paste. This fuel is ignited by the jet wick. The jet wick is decomposed by this process and the fuel, contained in the engine cylinder, burns to produce gaseous particles that are ejected at very high velocity from the nozzle 22. The jet engine 20 burns until the fuel is exhausted, and the charge on the helicopter is discharged or reduced to a safe level.

The jet engines are very small and light and the mounting bracket 30 is of a type that permits easy changing of the engine units. The engines can be replaced for additional discharging operations and the exhausted units can be refilled with fuel pellets or paste or reused.

A series of jet engines can be mounted together to cover as many discharge functions as may be necessary in the course of a flight or mission or an aircraft. In this case, each of the jet engines would have a separate heating coil and igniting switch.

The amount of triboelectric charge will vary with individual situations including the size — in electrical capacity — of the aircraft, its distance above ground, the air speed of the aircraft or its rotors, and, of course, the atmospheric conditions. The effective discharge that can be realized by this device will depend on the size of the jet engine, the amount and velocity of the gaseous jet stream, the length of time that it burns and the distance above ground. The characteristics of the jet engine must be chosen to accommodate a given situation.

If more discharge is needed, or a faster rate of discharge is desired, it is obvious that two or more units may be connected in parallel and fired simultaneously in the same or in different directions to insure a rapid and complete discharge of the static electricity on the aircraft.

Although the jet nozzle would, logically, be directed toward the ground, it can, actually, be pointed in almost any direction, away from the aircraft, and still reduce the electrostatic charge on the aircraft.

While a typical jet engine is shown and described, it is obvious that almost any of the jet engines of this or other types that are available could be used here. The engines may use other types of fuel, that have similar characteristics, or other types of wicks, or be ignited by other means.

The mountings can be of conventional types or could be made to project through the shell of the aircraft, with the obvious advantages of servicing and replacement of the jet engines from inside the aircraft, and safer wiring.

The effective electrical capacity of a typical helicopter at a height about 10 times its overall length would be in the order of 250 picofarads. This capacity may reach 400 picofarads at heighths of from 5 to 10 feet above the ground. It follows that a helicopter which has obtained a potential of 100 kilovolts, relative to ground, may carry a charge of 2 joules.

In a typical embodiment of this invention the jet engine may be one of the "JETEX engines" that are available in local hobby shops. The "PAY-LOADER 150", for example, has an empty weight of 0.7 ounces, a loaded weight of 1.3 ounces and a thrust of 1.81 to 2 ounces with an engine run of 12 to 16 seconds. The engine uses a "Jetex," solid-fuel pellet, which is a gas producing pellet with a controlled rate of burning. The gas generated by the precise burning rate of the pellet exhausts through a metered hole in the end cap of the jet engine to produce the gaseous jet. A single one of these units should effectively discharge a typical helicopter, under normal conditions, at a height of about 10 feet above ground.

The battery 28 may be the DC power supply of the aircraft. The heating coil and switching arrangements are conventional.

We wish it to be understood that we do not desire to be limited to the exact details of manufacture as described, for obvious modifications will occur to a person skilled in the art.

What is claimed is:

1. A device for discharging an electrostatic charge from an aircraft comprising at least one small gas producing cartridge in addition to the flight-controlling power means of said aircraft, said cartridge having an exhaust-jet-nozzle and containing ignitable fuel; means for attaching said gas producing cartridge to the surface of said aircraft with the said jet nozzle directed away from said aircraft, and means for igniting said fuel.

2. A device for discharging an electrostatic charge from an aircraft as in claim 1 having a plurality of said small gas producing cartridges, and means for igniting two or more of said gas producing cartridges at the same time.

3. A device for discharging an electrostatic charge from an aircraft as in claim 1 having a plurality of said small gas producing cartridges and separate means for igniting each of said gas producing cartridges.

4. A device for discharging an electrostatic charge from an aircraft as in claim 1 wherein said means for igniting said fuel comprises a heating element, a source of electric current, and a switch connected in series; and a jet wick extending between said heating element and said ignitable fuel; said switch positioned inside of said aircraft and connecting said source of electric current to said heating coil to ignite said jet wick, which, in turn, ignites said fuel.

* * * * *